US011731358B2

(12) United States Patent
Storey et al.

(10) Patent No.: US 11,731,358 B2
(45) Date of Patent: Aug. 22, 2023

(54) FIBROUS SEAL FOR A PRINT PARTICLE VESSEL

(71) Applicant: HEWLETT-PACKARD DEVELOPMENT COMPANY, L.P., Spring, TX (US)

(72) Inventors: Matthew James Storey, Austin, TX (US); Jefferson Blake West, Austin, TX (US); Bennett Alexander Nadeau, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 17/045,850

(22) PCT Filed: Aug. 30, 2018

(86) PCT No.: PCT/US2018/048751
§ 371 (c)(1),
(2) Date: Oct. 7, 2020

(87) PCT Pub. No.: WO2020/046316
PCT Pub. Date: Mar. 5, 2020

(65) Prior Publication Data
US 2021/0138731 A1 May 13, 2021

(51) Int. Cl.
| B29C 64/255 | (2017.01) |
| B33Y 40/00 | (2020.01) |
| B33Y 70/00 | (2020.01) |
| G03G 15/08 | (2006.01) |
| B65D 83/00 | (2006.01) |

(52) U.S. Cl.
CPC ............ *B29C 64/255* (2017.08); *B33Y 40/00* (2014.12); *B33Y 70/00* (2014.12); *B65D 83/0005* (2013.01); *G03G 15/0881* (2013.01)

(58) Field of Classification Search
CPC .......................... B29C 64/255; G03G 15/0881
See application file for complete search history.

(56) References Cited

U.S. PATENT DOCUMENTS

| 4,215,701 A | 8/1980 | Raitto |
| 5,650,841 A | 7/1997 | Matsuda et al. |
| 6,259,877 B1 | 7/2001 | Taniyama et al. |
| 6,554,600 B1 * | 4/2003 | Hofmann ................ B29C 41/34 425/182 |

(Continued)

FOREIGN PATENT DOCUMENTS

| CN | 2374347 | 4/2000 |
| CN | 107126603 A | 9/2017 |

(Continued)

*Primary Examiner* — Timothy Kennedy
(74) *Attorney, Agent, or Firm* — Foley & Lardner LLP

(57) ABSTRACT

Examples of a print particle transfer device are described herein. Some examples of the print particle transfer device include a print particle vessel to contain print particles. In some examples, the print particle transfer device also includes a plunger with a fibrous seal element to engage an inside surface of the print particle vessel. The fibrous seal element seals an interface between the plunger and the inside surface of the print particle vessel to prevent escape of the print particles at the interface during movement of the plunger within the print particle vessel.

19 Claims, 5 Drawing Sheets

(56) References Cited

U.S. PATENT DOCUMENTS

| | | | |
|---|---|---|---|
| 6,862,420 B1* | 3/2005 | Less | G03G 15/0867 |
| | | | 399/258 |
| 6,971,651 B2 | 12/2005 | Frauhammer et al. | |
| 7,062,195 B2 | 6/2006 | Kurihara et al. | |
| 7,204,684 B2* | 4/2007 | Ederer | B29C 64/259 |
| | | | 425/375 |
| 9,309,042 B2 | 4/2016 | Digregorio et al. | |
| 2004/0027430 A1* | 2/2004 | Anderson | B41J 2/17513 |
| | | | 347/86 |
| 2008/0223209 A1 | 9/2008 | Slater | |
| 2011/0038647 A1* | 2/2011 | Kawamura | G03G 15/0881 |
| | | | 399/106 |
| 2012/0216673 A1 | 8/2012 | Chang | |
| 2016/0022918 A1 | 1/2016 | Gunzel | |
| 2017/0246394 A1 | 8/2017 | Cabiri | |
| 2018/0111198 A1 | 4/2018 | Vitanov et al. | |
| 2019/0128419 A1* | 5/2019 | Pieger | B22F 12/222 |
| 2019/0231983 A1* | 8/2019 | Carper | A61M 5/31525 |
| 2021/0023787 A1 | 1/2021 | Busato et al. | |

FOREIGN PATENT DOCUMENTS

| | | | |
|---|---|---|---|
| CN | 108407286 A | 8/2018 | |
| DE | 1292787 | 4/1969 | |
| JP | 2003-084549 A | 3/2003 | |
| WO | WO-2017220385 A1 * | 12/2017 | B22F 1/0003 |

* cited by examiner

FIBROUS SEAL FOR A PRINT PARTICLE VESSEL

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Figure 1:
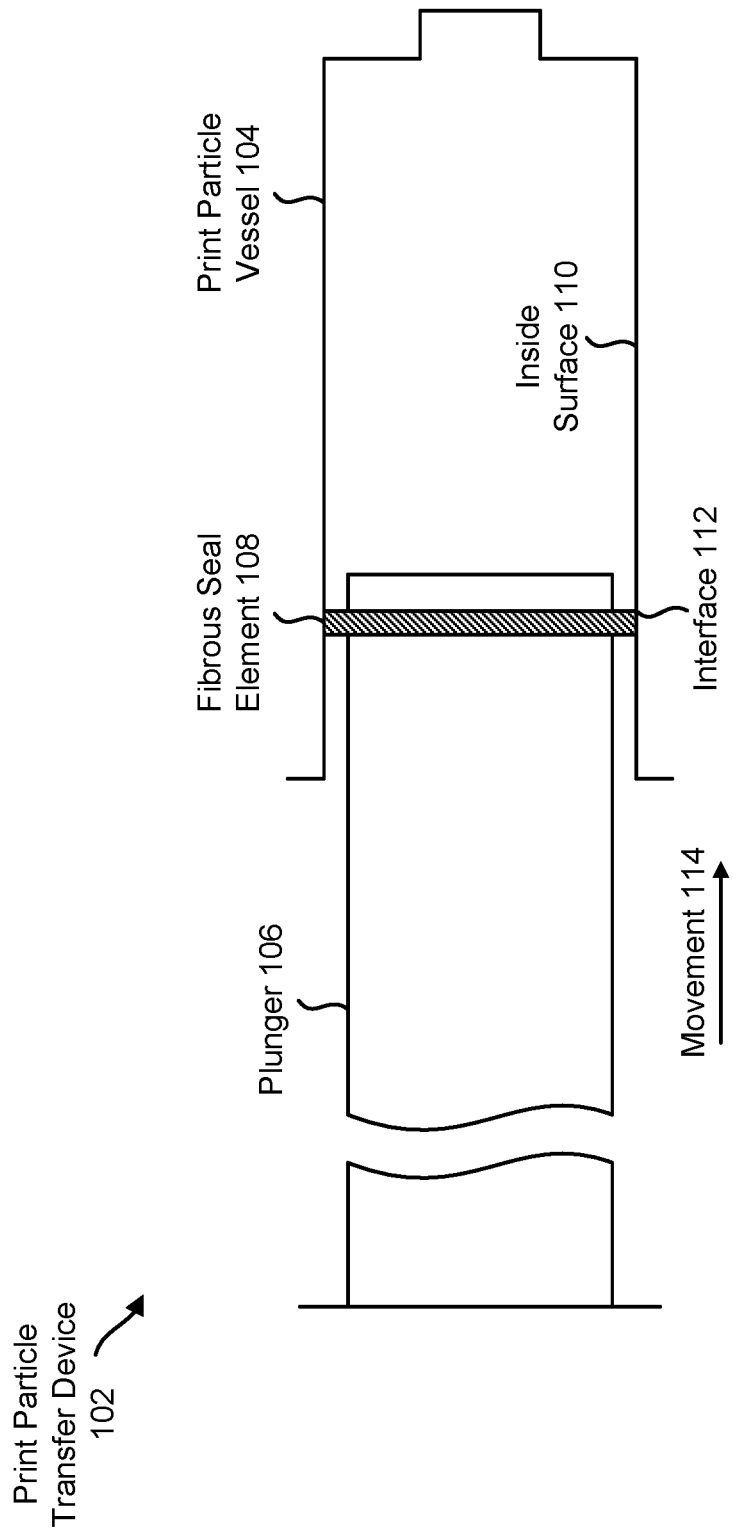
FIG. 1 illustrates an example of a print particle transfer device.

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round.

Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

In some examples, a print particle transfer device may include a plunger to actuate movement of print particles contained within a print particle vessel. For example, as the plunger moves, the plunger face may press against the print particles to expel the print particles out of an opening in the print particle vessel.

The devices and techniques described herein provide for a fibrous seal element in a plunger of a print particle transfer device. The fibrous seal element may successfully protect elastomeric (e.g., rubber) air seals of a plunger from print particles (e.g., toner). In some examples, the print particle transfer device may be implemented as a syringe.

In some implementations, syringes rely on air seals—small ring features on the plunger head—to maintain sealing. However, when pushing print particles through a syringe, the air seals may be easily fouled. For example, the air seals may be damaged due to the abrasive nature of print particles. Fouling the plunger air seal may create a number of potential failure modes for print particle transfer. For example, air may leak between the air seals and/or print particles may escape past the air seals. This may result in print particles becoming airborne or the print particles becoming contaminated within the print particle vessel. Additionally, fouling of the air seals by the print particles may result in additional friction, which may inhibit the movement of the plunger.

In the devices and techniques described herein, a print particle transfer device may include a plunger for pushing print particles towards an output of a print particle vessel. The plunger may include a fibrous seal element to move and seal the plunger with respect to the inside surface of the print particle vessel. In some examples, the fibrous seal element is a felt wipe seal, which successfully protects the elastomeric air seals from print particles. Further, the fibrous seal element may ensure that air does not escape around the plunger. Additionally, the fibrous seal element may maintain a more constant pressure for the entire duration of the plunger press.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

FIG. 1 illustrates an example of a print particle transfer device 102. The print particle transfer device 102 may be a container that holds print particles for donation (e.g., transfer or delivery) to a receiving container. In some examples, the receiving container may be part of a host device (e.g., print cartridge and/or printer).

Examples of the print particle transfer device 102 include containers, bottles, syringes, and cartridges. The print particle transfer device 102 may contain and/or transfer print particles. For example, the print particle transfer device 102 may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of a reservoir of print particles. Accordingly, it may be beneficial to replenish the reservoir in a host device with print particles rather than replacing the host device.

In some examples, the print particle transfer device 102 may include a print particle vessel 104 to contain print particles. The print particle vessel 104 may be adapted with an output on one end through which print particles may exit the print particle vessel 104. The print particle vessel 104 may be adapted with an opening on another end to receive a plunger 106. For example, the plunger 106 may nest within the print particle vessel 104.

In some examples, the print particle vessel 104 may have a cylindrical shape about a central axis. As used herein, the term "cylindrical" may mean approximate conformity to a cylinder shape. For example, the print particle vessel 104 may include one or more portions that conform to or approximate a cylinder shape. In some examples, the print particle vessel 104 may have a non-cylindrical shape. For example, the print particle vessel 104 may have an oval shape, a rectangular shape, a square shape, or other shape. The walls of the print particle vessel 104 may form a cavity to contain print particles.

The print particle vessel 104 may also include a plunger 106. In some examples, the plunger 106 may be an actuator device adapted to press against the print particles within the print particle vessel 104 to expel the print particles out of the output of the print particle vessel 104. The plunger 106 may be sized to slide within the interior of the print particle vessel 104 with little to no resistance. In some examples, the plunger 106 or a leading portion of the plunger 106 (e.g., the plunger head) may have a similar shape as the print particle vessel 104. For example, if the print particle vessel 104 is circular, then the plunger head may also have a circular shape.

The plunger 106 may include a fibrous seal element 108 to engage the inside surface 110 of the print particle vessel 104. The fibrous seal element 108 seals an interface 112 between the plunger 106 and the inside surface 110 of the print particle vessel 104 to prevent escape of the print particles at the interface 112 during movement 114 of the plunger 106 within the print particle vessel 104. For example, the fibrous seal element 108 may be sized to press against the inside surface 110 of the print particle vessel 104 during the entire movement 114 of the plunger 106. During movement 114 of the plunger 106, the fibrous seal element 108 may wipe print particles from the inside surface 110 of the print particle vessel 104. This wiping action may prevent print particles from leaking out of the interface 112 of the plunger 106 and the inside surface 110. The fibrous seal element 108 may inhibit air escape from around the interface 112 during movement 114 of the plunger 106. Additionally, the fibrous seal element 108 may maintain a constant pressure on the inside surface 110 of the print particle vessel 104 during movement 114 of the plunger 106.

In some examples, the fibrous seal element 108 may be composed of a felt or felt-like material. As used herein, felt may refer to a material formed from compressed, matted and/or condensed fibers. The fibrous seal element 108 may be made from natural fibers, synthetic fibers or a combination thereof. The fibrous nature of felt may facilitate a seal that is resistant to the abrasive quality of print particles.

In some examples, the fibrous seal element 108 may be attached to the plunger 106. For example, the fibrous seal element 108 may be formed with an interior opening (e.g., a hole). In the case of a circular plunger head, the fibrous seal element 108 may be implemented as an annular ring. The interior opening of the fibrous seal element 108 may be sized to enable the fibrous seal element 108 to sit within a recess (e.g., channel, groove, etc.) of the plunger 106. The plunger 106 may be pressed through the interior opening of the fibrous seal element 108 such that the fibrous seal element 108 is seated and held in the recess of the plunger 106.

In some examples, the fibrous seal element 108 may be attached to the plunger 106 via an adhesive. In yet other examples, the fibrous seal element 108 may be attached to the plunger 106 via a mechanical fastener (e.g., a screw).

Figure 2:
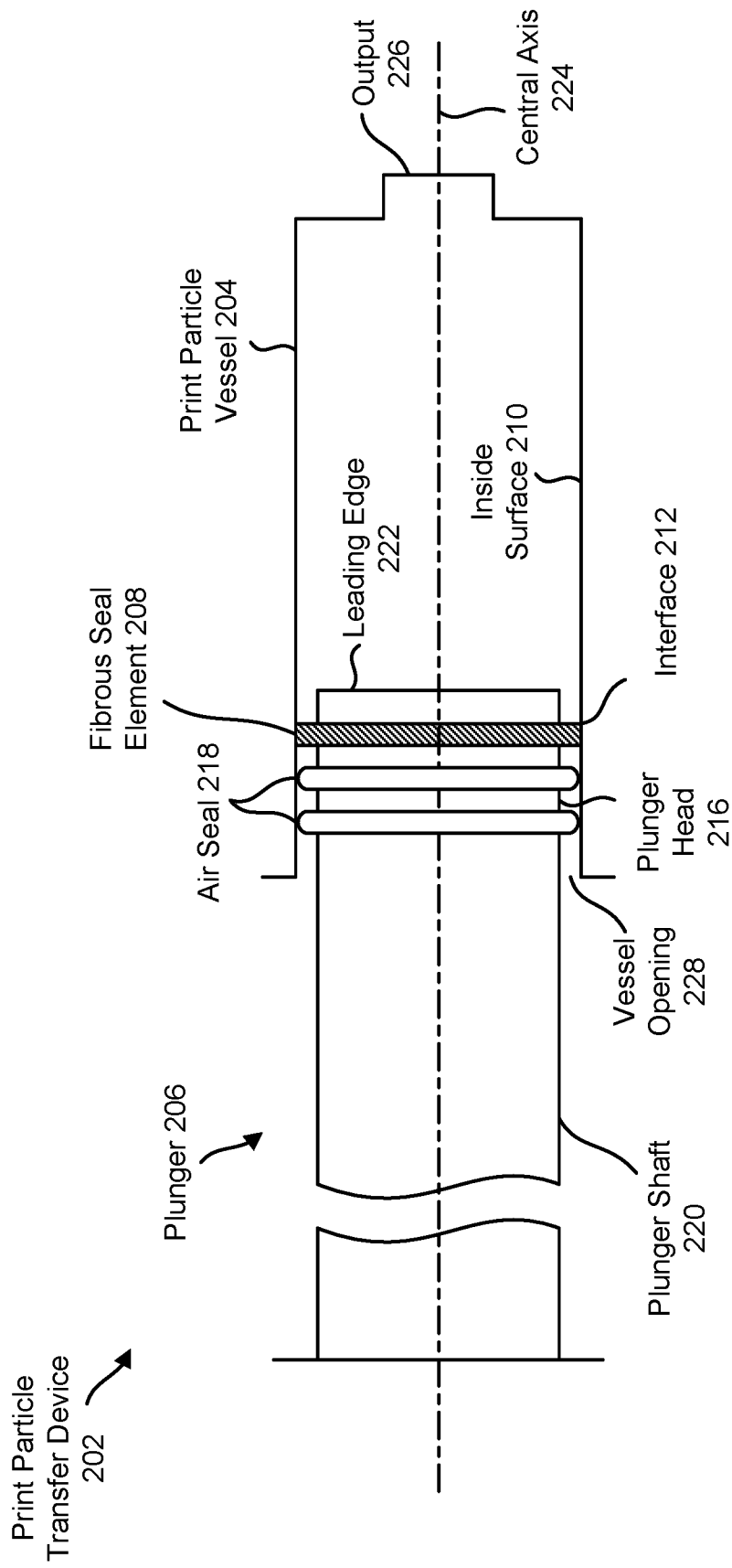
FIG. 2 illustrates another example of a print particle transfer device.

FIG. 2 illustrates another example of a print particle transfer device 202. In some examples, the print particle transfer device 202 may be implemented in accordance with the print particle transfer device 102 described in connection with FIG. 1.

The print particle transfer device 202 may include a print particle vessel 204 with an output 226 at one end and a vessel opening 228 at the other end. The plunger 206 may enter the print particle vessel 204 at the vessel opening 228. The plunger 206 may align with a central axis 224 of the print particle vessel 204.

The plunger 206 may include a plunger shaft 220. The length of the plunger shaft 220 may be sized to facilitate movement of the plunger 206 through the length of the print particle vessel 204.

The plunger 206 may also include a plunger head 216. The plunger head 216 may be adapted to couple to the plunger shaft 220. In some examples, the plunger head 216 may be composed of an elastomeric material (e.g., rubber). The plunger head 216 may be formed with at least one air seal 218. An air seal 218 may project out from the main body of the plunger head 216. An air seal 218 may be sized to contact the inside surface 210 of the print particle vessel 204 to create a seal between the plunger head 216 and the print particle vessel 204.

The plunger 206 may also include a fibrous seal element 208. In some examples, the fibrous seal element 208 may be a compressed fiber material (e.g., felt or a felt-like material). The fibrous seal element 208 may be positioned near the leading edge 222 of the plunger head 216. The leading edge 222 may be the edge of the plunger face on the plunger head 216 that is exposed to the print particles in the print particle vessel 204. In some examples, the fibrous seal element 208 may be offset from the leading edge 222. In other examples, the fibrous seal element 208 may be aligned (e.g., coplanar) with the leading edge 222.

The fibrous seal element 208 may protect the elastomeric air seal 218 from print particles during movement of the plunger 206. For example, the fibrous seal element 208 may seal the interface 212 between the plunger 206 and the inside surface 210 of the print particle vessel 204 to prevent escape of the print particles at the interface 212 during movement of the plunger within the print particle vessel 204.

The fibrous seal element 208 may wipe print particles from the inside surface 210 of the print particle vessel 204 during movement of the plunger 206. The print particles may be wiped in the direction of the plunger movement such that print particles do not pass the interface 212 of the fibrous seal element 208 and the inside surface 210 of the print particle vessel 204. Therefore, the fibrous seal element 208 may prevent print particles from coming in contact with the air seals 218.

Figure 3:
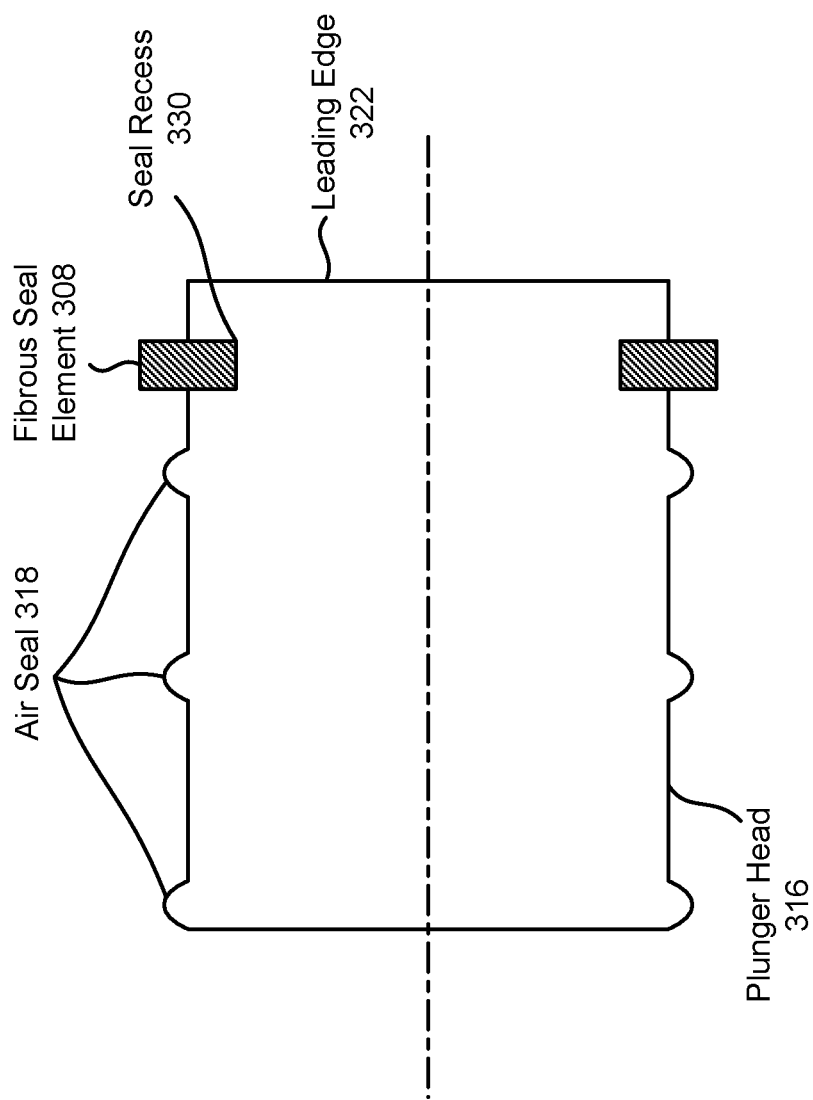
FIG. 3 is a section view of an example of a plunger head and fibrous seal element.

FIG. 3 is a section view of an example of a plunger head 316 and fibrous seal element 308. In some examples, the plunger head 316 may be composed of an elastomeric material (e.g., rubber). For example, the plunger head 316 may be formed from molded rubber.

The plunger head 316 may include at least one air seal 318. In the example of FIG. 3, the plunger head 316 includes three air seals 318, however the plunger head 316 may include any number of air seals 318. In some examples, an air seal 318 may be a ring-like structure that is molded into the plunger head 316. The air seals 318 may be sized to press against the inside surface of a print particle vessel to create a seal as the plunger head 316 moves within the print particle vessel.

In some examples, the plunger head 316 may include a seal recess 330 to accommodate the fibrous seal element 308. The seal recess 330 may be a channel, groove or other indentation that spans the perimeter (e.g., the circumference) of the plunger head 316. In some examples, the seal recess 330 may be molded into the elastomeric material of the plunger head 316. The seal recess 330 may be positioned near a leading edge 322 of the plunger head 316.

The seal recess 330 may be sized to accommodate the fibrous seal element 308. For example, the depth and width of the seal recess 330 may be sized to fit a fibrous seal element 308 implemented as an annular ring. Mating of the plunger head 316 and the fibrous seal element 308 may be accomplished by pressing the leading edge 322 of the plunger head 316 into the opening of the fibrous seal element 308 implemented as an annular ring.

In some examples, the fibrous seal element 308 may be positioned near the leading edge 322 before any of the air seals 318 of the plunger head 316. In this manner, the fibrous seal element 308 may protect the elastomeric air seals 318 from print particles during movement of the plunger head 316. For example, the fibrous seal element 308 may wipe print particles from the inside surface of the print particle vessel during movement of the plunger to prevent the print particles from contacting and fouling (e.g., damaging) the air seals 318.

The fibrous seal element 308 may be shaped to conform to the shape of the plunger head 316. For example, if the plunger head 316 is circular, the outside perimeter of the fibrous seal element 308 may also be circular. However, the outside perimeter of the fibrous seal element 308 may extend beyond the outside perimeter of the plunger head 316 to enable the fibrous seal element 308 to create a seal against the inside surface of the print particle vessel.

In some examples, the outside perimeter of the fibrous seal element 308 may extend beyond the outside perimeter of the air seals 318. In the case of a circular plunger head 316, the outside circumference of the fibrous seal element 108 may extend beyond the circumference of the elastomeric air seals 318. This may ensure that the fibrous seal element 308 achieves a tight seal when compressed against the inside surface of the print particle vessel.

Figure 4:
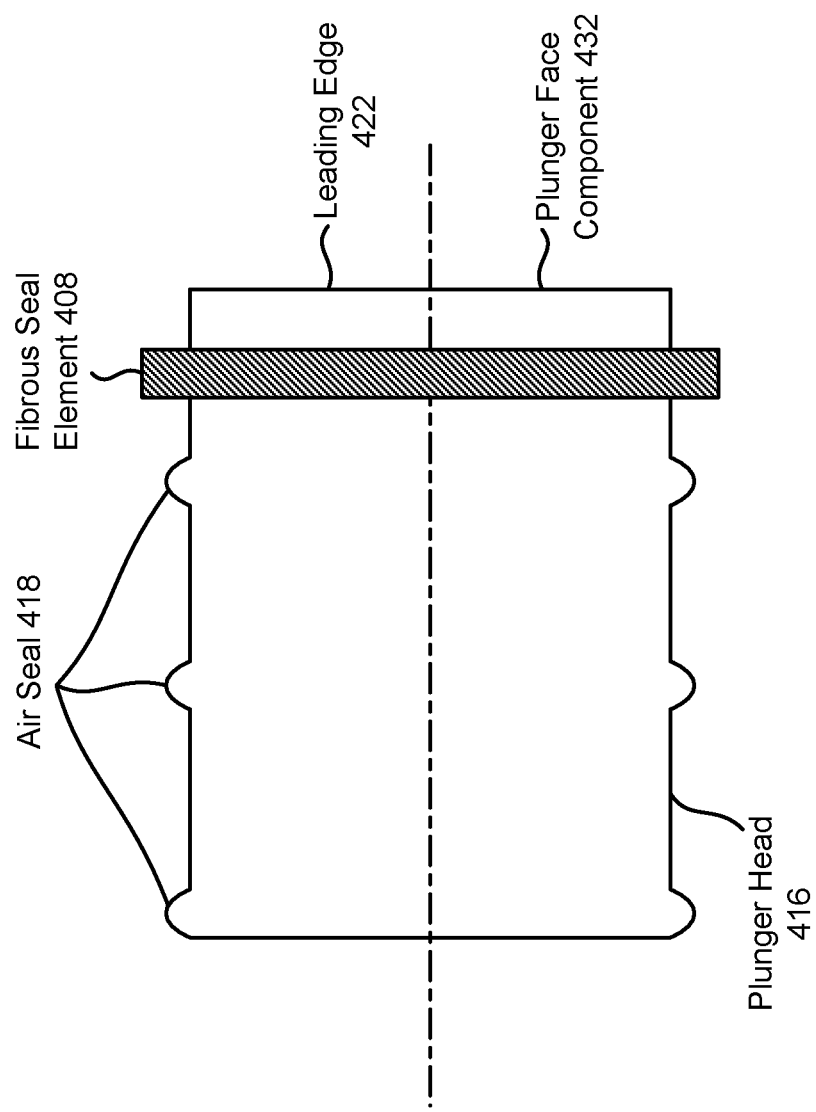
FIG. 4 is a section view of another example of a plunger head and fibrous seal element.

FIG. 4 is a section view of another example of a plunger head 416 and fibrous seal element 408. In some examples, the plunger head 416 may be composed of an elastomeric material (e.g., rubber). For example, the plunger head 416 may be formed from molded rubber. The plunger head 416 may include at least one air seal 418.

In the example of FIG. 4, the fibrous seal element 408 may be positioned between the plunger head 416 and a separate plunger face component 432. For example, the plunger face component 432 may include the leading edge 422 of the plunger that is exposed to the print particles in the print particle vessel. The plunger face component 432 may or may not be composed of the same material (e.g., elastomeric material) as the plunger head 416.

The fibrous seal element 408 may be attached to both the plunger head 416 and the plunger face component 432. For example, the fibrous seal element 408 may be bonded to the plunger head 416 and the plunger face component 432 with an adhesive. In another example, the fibrous seal element 408 may be attached to the plunger head 416 and the plunger face component 432 with a mechanical fastener (e.g., screw).

In some examples, the fibrous seal element 408 may be unperforated. For example, because the fibrous seal element 408 is attached between the plunger head 416 and the separate plunger face component 432, the fibrous seal element 408 may be formed without holes or other internal openings. In the case of a circular plunger head 416, the fibrous seal element 408 may have a solid disk shape.

Figure 5:
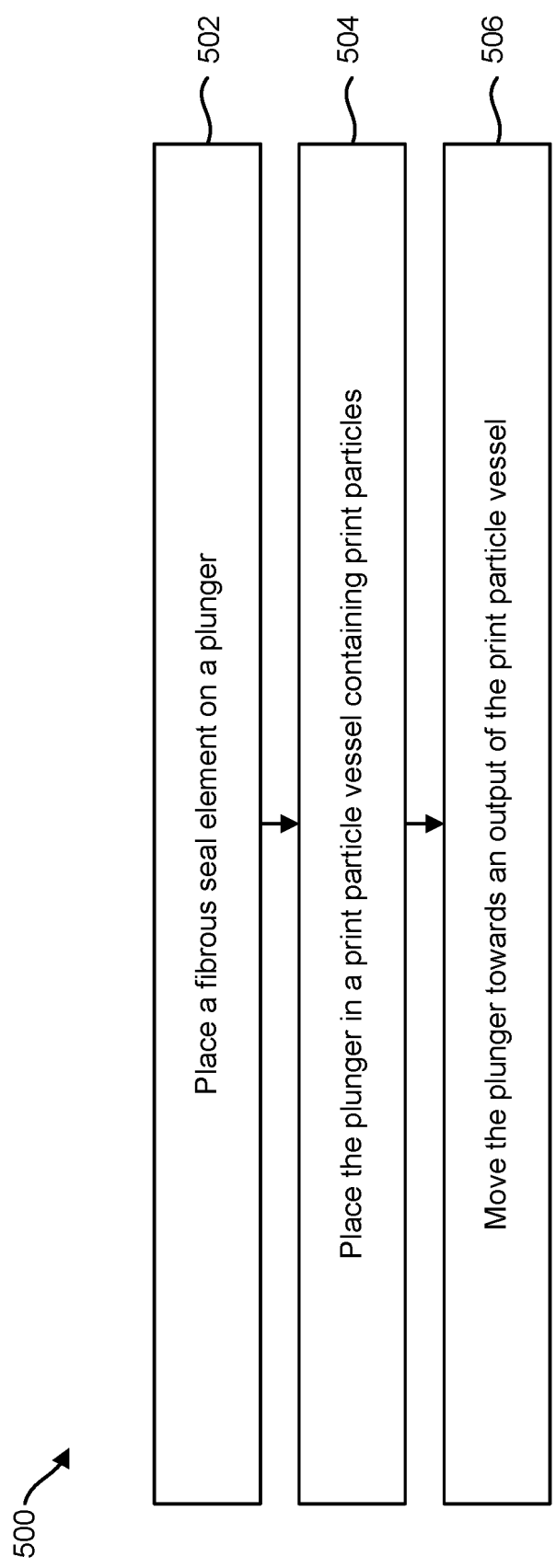
FIG. 5 is a flow diagram illustrating an example of a method for transferring print particles.

FIG. 5 is a flow diagram illustrating an example of a method 500 for transferring print particles. The method 500 may be performed by and/or with at least one of a print particle transfer device 102, 202 described herein.

A fibrous seal element 108 may be placed 502 on a plunger 106. In some examples, the fibrous seal element 108 may have an interior opening sized to mate with the plunger 106. For example, the fibrous seal element 108 may be an annular ring. The plunger 106 may include a recess 330 to receive the fibrous seal element 108. The recess 330 may be positioned near a leading edge 322 of the plunger 106. The leading edge 322 of the plunger 106 may be pressed into the interior opening of the fibrous seal element 108 until the fibrous seal element 108 is seated within the recess 330 of the plunger 106. The outside perimeter of the fibrous seal element 108 may extend beyond the outside perimeter of the plunger 106.

In some examples, the fibrous seal element 108 may be placed 502 between a plunger head 416 and a separate plunger face component 432. For example, the fibrous seal element 108 may be bonded (e.g., glued) between the plunger head and the separate plunger face component.

The plunger 106 may be placed 504 in a print particle vessel 104 containing print particles. For example, the print particle vessel 104 may be sized to receive the plunger 106 in a vessel opening 228. The fibrous seal element 108 of the plunger 106 may contact the inside surface 110 of the print particle vessel 104.

The plunger 106 may be moved 506 towards an output 226 of the print particle vessel 104. For example, a force may be applied to the plunger 106 to cause the plunger 106 to move into the print particle vessel 104. During movement 114 of the plunger 106 within the print particle vessel 104, the fibrous seal element 108 may seal the interface 112 between the plunger 106 and the inside surface 110 of the print particle vessel 104 to prevent escape of the print particles at the interface 112. For example, the fibrous seal element 108 may wipe print particles from the inside surface 110 of the print particle vessel 104 during movement of the plunger 106.

In some examples, the fibrous seal element 108 may inhibit air escape from around the interface during movement of the plunger 106. Additionally, the fibrous seal element 108 may maintain a constant pressure on the inside surface 110 of the of the print particle vessel 104 during movement 114 of the plunger 106.

The invention claimed is:

1. A print particle transfer device comprising:
a print particle vessel to contain print particles; and
a plunger comprising a seal and a seal element, the seal and the seal element facing an inside surface of the print particle vessel, wherein the seal element seals an interface between the plunger and the inside surface of the print particle vessel to prevent escape of the print particles past the interface during movement of the plunger within the print particle vessel, and to prevent the print particles from coming in contact with the seal, and wherein an outside perimeter of the seal element extends beyond an outside perimeter of the seal.

2. The print particle transfer device of claim 1, wherein the seal element comprises a fibrous material.

3. The print particle transfer device of claim 1, wherein the plunger comprises an elastomeric plunger head, and wherein the seal and the seal element are on the elastomeric plunger head.

4. The print particle transfer device of claim 1, wherein the seal element is coplanar with a leading edge of a plunger head of the plunger, and wherein the leading edge is exposed to the print particles in the print particle vessel.

5. The print particle transfer device of claim 1, wherein the seal element is to wipe the print particles from the inside surface of the print particle vessel during the movement of the plunger.

6. The print particle transfer device of claim 1, wherein the seal element inhibits air escape from around the interface during the movement of the plunger.

7. The print particle transfer device of claim 1, wherein the seal element maintains a constant pressure on the inside surface of the print particle vessel during the movement of the plunger.

8. The print particle transfer device of claim 1, wherein the seal comprises a ring-like structure and is molded onto a plunger head of the plunger.

9. The print particle transfer device of claim 1, wherein the seal comprises an air seal that is farther away from a leading edge of a plunger head of the plunger than the seal element.

10. The print particle transfer device of claim 1, wherein the seal is an elastomeric air seal.

11. The print particle transfer device of claim 1, wherein the plunger comprises a recess to accommodate the seal element.

12. The print particle transfer device of claim 1, wherein the seal element is offset from a leading edge of a plunger head of the plunger.

13. The print particle transfer device of claim 1, wherein the seal comprises a plurality of air seals.

14. The print particle transfer device of claim 13, wherein the plurality of air seals comprises three air seals.

15. The print particle transfer device of claim 1, wherein the seal element is positioned between a plunger head of the plunger and a separate plunger face component.

16. The print particle transfer device of claim 1, wherein the seal is molded to the plunger.

17. The print particle transfer device of claim 1, wherein the seal element comprises an annular ring.

18. The print particle transfer device of claim 1, wherein the seal element is shaped to conform to a shape of a plunger head of the plunger.

19. The print particle transfer device of claim 1, wherein the plunger comprises a plunger head, and wherein an outside perimeter of the seal element extends beyond an outside perimeter of the plunger head.

* * * * *